United States Patent [19]

Cotte

[11] 4,456,576
[45] Jun. 26, 1984

[54] METHOD OF FLUSHLY EMBEDDING AN INLAY

[75] Inventor: André Cotte, Chabreloche, France

[73] Assignee: Etablissements Marcel Cotte, France

[21] Appl. No.: 263,056

[22] Filed: May 13, 1981

[30] Foreign Application Priority Data

May 13, 1980 [FR] France ................. 80 10723

[51] Int. Cl.³ ................ B29C 5/08; B29C 6/00; B29D 3/00; B29D 9/00
[52] U.S. Cl. ................... 264/255; 264/509; 264/275; 264/320; 425/112; 425/129 R
[58] Field of Search ............ 264/250, 255, 275, 276, 264/271.1, 279, 245, 246, 274, 509, 513, 278, 320; 249/83, 88; 428/67; 30/340, 164; 16/110 R; 425/112, 129

[56] References Cited

U.S. PATENT DOCUMENTS

| | | | |
|---|---|---|---|
| 3,227,787 | 1/1966 | Battenfeld | 264/509 |
| 3,247,550 | 4/1966 | Haines | 264/275 |
| 3,608,020 | 9/1971 | Langecker | 264/509 |
| 3,759,644 | 9/1973 | Ladney | 425/124 |
| 4,067,947 | 1/1978 | Miori | 264/250 |
| 4,144,303 | 3/1979 | Glatt et al. | 425/129 R |

OTHER PUBLICATIONS

Anon., Plastics World, Cahners Pub., Boston, (Apr. 1977), p. 75.

*Primary Examiner*—Willard E. Hoag

[57] ABSTRACT

The invention concerns a method for the flush embedding of an inlay in the surface, particularly the curved surface, of a molded main piece.

This method is characterized by the fact that, before the mold is filled with the material constituting the main piece, the inlay (1) is introduced into the mold (4) and is placed in the proper relative position on the article (3) that is to be made, the inlay (1) is held in this position, and the inlay (1) is forcibly deformed so as to have a shape complementary to that of the mold (4).

The invention is applied to the manufacture of molded pieces.

13 Claims, 7 Drawing Figures

METHOD OF FLUSHLY EMBEDDING AN INLAY

The invention relates to a method and an apparatus for embedding an inlay into the surface of a main piece obtained by means of a mold and also the article obtained by the use of the method or apparatus, particularly a cutlery or hand tool handle.

Methods are known for embedding an inlay having initially an at least quasi-flat outer face into the surface, particularly the curved surface, of a stiff main piece obtained by means of a mold filled with the material constituting the main piece, such as a plastic material. In one known embodiment of an apparatus for the practice of a variant of this method, the mold includes a fixed internal piece passing through it from side to side, which bulges at its end portion adjacent the area of the mold corresponding to the surface of the main piece where the inlay is to be located. In a first phase of the method, the main piece is made. Owing to the presence of the internal piece in the mold, the main piece contains a hole passing through it from side to side, opening at its curved surface where the inlaid element is to be located, in a broadened area serving as a seat. In a second phase, a stud associated rigidly and perpendicularly with the inlay is introduced into the hole from the side of its inner face, until the circumferential margin of the inner face of the inlay is applied to the seat area of the hole.

In a third phase, the inlay is bonded rigidly to the main piece, for example by riveting. In this case, a second inlay complementary to the first is introduced through the second end of the hole opposite the broadened area. Since the inlay has an initial quasi-flat shape, whereas the surface of the main piece is curved, it follows that the outer face of the inlay generally protrudes from the curved surface of the main piece. This is why, in a fourth phase of the method, one proceeds to a polishing or other such operation to remove this protrusion.

Therefore, this procedure is long, costly, and delicate to perform. Furthermore, it requires the employment of an inlay having a stud, which increases the cost. Also, this known method requires the presence of a second, likewise inlaid element, opposite the first inlay.

Methods are also known for affixing a thin, pliable and deformable label, of paper for example, to the outer surface of a hollow body of synthetic material, such as a bottle; in these methods this label is placed in a mold, in its permanent relative location, and then the hollow body is made by blow-molding or the like. However, these known methods are of limited usefulness and cannot be applied to the case herein considered, in which the inlay is not entirely pliable, deformable and thin, but on the contrary is stiff, having a certain stability, and being able to have a certain thickness; the body is not hollow and made by blow-molding, but solid. In these known methods, the label is overlaid onto the hollow body, and this does not constitute true inlaying as is desired in the invention, wherein the outer face of the inlay is continuous with the outer face of the main piece.

The present invention aims to remedy these difficulties, and to this end it proposes a method for flushly embedding an inlay having a certain malleability, of an initial quasi-flat shape, into the curved surface of a substantially solid main piece made by using a mold, in which the inlay is introduced into the mold; it is placed in the relative position corresponding to the location which it is to have on the article made with this mold; the inlay is then held fixedly in this position and the inlay is forcibly deformed so as to have a shape complementary to that of the mold. This method does not involve any phase of polishing or the like following the filling of the mold, which would have the exclusive purpose of removing any projection of the inlay with respect to the main piece. The method comprises a single phase for the making of the main piece and the bonding of the inlay to this main piece by virtue of this same making.

The invention also relates to an apparatus for the practice of the method, which comprises in combination means for placing the inlay in the relative position which it is to occupy in the mold; means for holding the inlay in this position, and means for forcibly deforming the inlay so that it will have a shape complementary to that of the mold.

The invention lastly proposes an article such as a cutlery or hand tool handle obtained by the method or by means of the apparatus of the invention.

The invention offers numerous advantages over the known state of the art; the method is simpler to employ than formerly, because it is not necessary to provide for a specific phase for bonding the inlay and for a specific polishing phase.

These advantages are obtained without substantially increasing the complexity of the apparatus for the practice of the method. Finally, the article obtained by the practice of the method or by means of the apparatus has a better finish than that made formerly, and the inlay does not have to comprise an affixing stud or the like.

The rest of the features and advantages of the invention will appear from the description that follows, in conjunction with the appended drawings, wherein.

Figure 1:
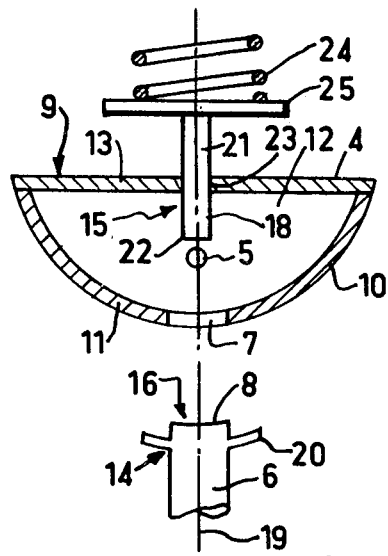
FIGS. 1, 2, 3, 4 and 5 are five diagrammatical, cross-sectional views showing an apparatus in accordance with the invention at different operational stages.

The invention concerns a method and an apparatus for the flush embedding of an inlay 1 which is stiff but has a certain malleability, that is, one which can be shaped by applying a sufficient force, having an at least quasi-flat general shape, of more or less great thickness, into the surface 2, particularly a curved surface, of a solid or substantially solid, stiff main piece 3.

The device comprises a mold 4 having internally the exterior shape of the main piece 3, and means 5 for the filling of the mold 4 with the constituent material of the piece 3, referred to hereinafter as "the material," for the purpose of making this piece. The mold 4 and the means 5 are not in themselves part of the invention. The means 5 comprise, for example, an aperture in the mold and means for the injection of the material.

The term "embed" is to be understood to mean to associate such that the inlay is an integral part of the main article, the inlay being included in the main piece, an area of the outer surface of the main article being constituted of the inlay which is thus sunk flushly in the main piece.

Figure 3:
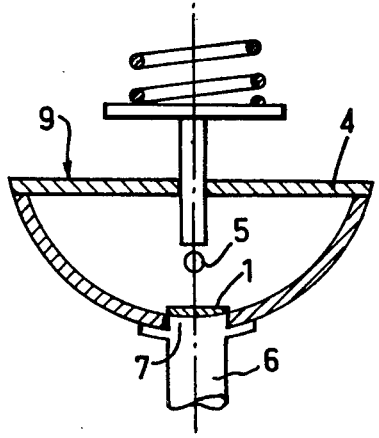
Figure 4:
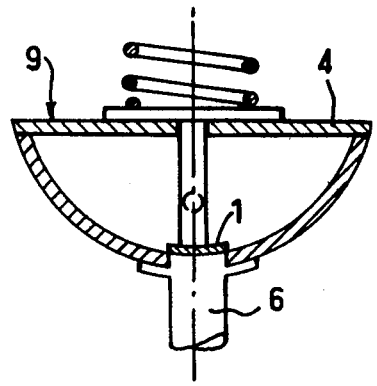

In the process, before filling the mold 4 with the material, the following successive operations are performed:

The inlay 1 is introduced in its initial form into the mold 4 and is placed in the relative position corresponding to the location which it is to occupy on the piece 3 made by means of this mold 4 (FIG. 3). The inlay 1 is then held fixedly in this position. Then the inlay 1 is forcibly deformed so that it will have a shape complementary to that of the mold 4 (FIG. 4).

The process does not involve any operation of polishing or the like, after the mold 4 is filled with the material, for the sole purpose of eliminating any superelevation of the inlay 1 above the main piece 3. Despite the absence of any such operation, the inlay 1 is embedded in the surface of piece 3 without projecting above the latter.

Thus, the process comprises a single phase wherein the main piece 3 is made and the inlay 1 is bonded to the main piece 3, because the making of the main piece 3 likewise serves the purpose of bonding the inlay. Once the main piece 3 has been made, there is no relative movement of the latter in relation to the inlay 1 and there is no possibility of untimely separation. The main piece 3 has a shape complementing that of the inlay 1, the latter being situated in a "hold-out" in the main piece 3.

To place the inlay 1 in the relative position which it is to occupy in the mold 4, the following successive operational phases are preferentially performed: First the inlay 1 is placed on the support means 6 manually, semiautomatically or automatically. Then the support means 6 and the mold 4 are moved relatively to one another to bring the inlay 1 into the said relative position. Preferentially, the mold 4 is held in a fixed position and the means 6 is shifted about, by sliding combined, if necessary, with rotation, preferentially by sliding vertically upwardly, in a manual, semiautomatic or automatic manner.

To hold the inlay 1 in the relative position which it is to occupy in the mold 4, the inlay 1 is preferably firmly pressed against the support means 6. Since the inlay 1 is stiff, this pressure can be applied at one point or to a limited area without necessarily involving the entire surface of the inlay 1, particularly the surface area confronting the support means 6, and this makes it possible to provide a seat for the inlay 1 in the piece 3.

To bring the inlay 1 to a shape complementing that of the mold 4, a mold 4 is used which has an aperture 7 situated at the relative position of the inlay 1 and of the support means 6 presenting a support surface 8 for the inlay 1, [and] having a shape and size corresponding precisely to those of this aperture 7. The inlay 1 is pressed forcibly against the support surface 8 preferably mechanically and automatically, so as to deform it to match the shape of the surface 8. The deformation of the inlay 1 can result from an increase in the degree of pressure of the inlay 1 against the support means 6. Consequently the deformation presents the features thereof, such as the point pressure or limitedarea pressure.

The filling of mold 4 with the material is accomplished through the means 5. During this filling, the inlay 1 is held in its relative position. Then the mold is opened and the piece 3 containing the inlay 1 which does not project above the surface 1, can be stripped from the mold 4. The filling of the mold, that is, the production of the piece 3, provides for the bonding with the inlay 1.

The apparatus 9 for the practice of the method comprises first the mold 4, and the filling means 5.

The mold 4 is in the form, for example, of a shell 10 of elongated shape having a bottom 11 of upwardly facing concave shape provided with a main opening 12 for the removal of the completed piece 3, which can be closed by a removable cap 13. The filling means 5 is, for example, an orifice in the end wall of the shell 10.

The apparatus 9 then comprises means 14 for placing the inlay 1 in the relative position which it is to occupy in the mold 4 and which corresponds to the location of the inlay 1 on the piece 3 made with the mold 4, means 15 for holding inlay 1 in this position, and means 16 for forcibly deforming inlay 1 so as to provide it with a shape complementing that of the mold 4.

The apparatus 9 is not provided with polishing means or the like specifically designed to remove any projecting of the inlay 1 with respect to the main piece 3.

The means 15 and the means 16 are at least partially common.

The mold 4 comprises an aperture 7 of form, dimensions and relative position corresponding to the contour dimensions and relative position of inlay 1 in the mold 4. Of course, a mold can comprise a plurality of apertures such as 7, if the main piece 3 comprises a plurality of inlays such as 1.

The means 14 comprising support means 6 for the inlay 1 and means 17, which are manual, semiautomatic or automatic, for producing a relative displacement of the support means 6 and of the mold 4 for the purpose of bringing the support means 6 and the aperture 7 opposite one another. The means 17 comprise, if desired, guiding means, particularly sliding and, if necessary, rotating means. Preferably, the mold 4 remains fixed with regard to the shell 10 and the means 17 act upon the support means 6.

The means 15 comprise, in combination, the support means 6 and the pressure means 18 which can cooperate with the inlay 1 against the support means 6, in a point or limited-area manner, as already indicated.

The means 16 for deforming the inlay 1 are constituted by the shape given to the supporting surface 8 of the support means 6, this shape corresponding to that of the mold 4 at the location of its aperture 7 and also by the pressure means 18.

The aperture 7 is preferentially situated in the bottom part of the bottom 11. The support means 6 are preferably situated outside of the mold 4, particularly beneath the latter. The pressure means 18 are preferably situated at least partially within the mold 4.

The support means 6 is in the form of a mandrel whose axis is 19 and whose end surface, particularly the upper end surface, constitutes the support surface 8. The surface 8 is curved and concave as required, the concavity facing the mold 4.

Preferably, the mandrel has a peripheral projection 20 of a shape complementing the mold 4 at the edge of the aperture 7, the projection 20 being applied to the outside of the mold when the inlay 1 is in its correct relative position. The sealing cooperation of the projection 20 with the mold 4 is such that the end of the sliding travel of the mandrel corresponds to the correct relative position of the inlay 1 in the mold, and provides a satisfactory seal between the mandrel and the mold 4 at the aperture 7, for the filling of the mold. Complementary sealing means can be associated with the projection 20. However, this sealing action does not have to be great, since the mold is not filled under pressure as is the case with the making of hollow objects in the state of the art.

The means 17 can be embodied in many different ways available to the person skilled in the art, including slides, jacks, screws, motors, etc.

The support surface 8 precisely completes and prolongs the internal surface of mold 4 at the opening 7.

The pressure means 18 is in the form, for example, of a plunger 21 having the axis 19 and pointing downwardly. Its end portion 22 adjacent the inlay 1 is preferably of a smaller cross section than the cross section of inlay 1, particularly being pointed. This end portion 22 is to contact the central part of the inlay 1 on its inside face on the side opposite its outside face applied to the support surface 8. The plunger 21 passes through a bore 23 created on the axis 19 in the wall 13. The plunger 21 is mounted for sliding along the axis 19 and therefore appropriate guiding means and driving means of the same general type as the means 17 are associated with it. Resilient means 24 can be associated with the plunger 21 to bias it towards the opening 7. A projection 25 can be associated with the plunger 21, adapted to be applied to the wall 13 at the periphery of the bore 23 when the plunger 21 is in its position for holding the inlay 1 after it has been shaped. This projection 25 is intended to serve the same purpose as the projection 20.

Figure 2:
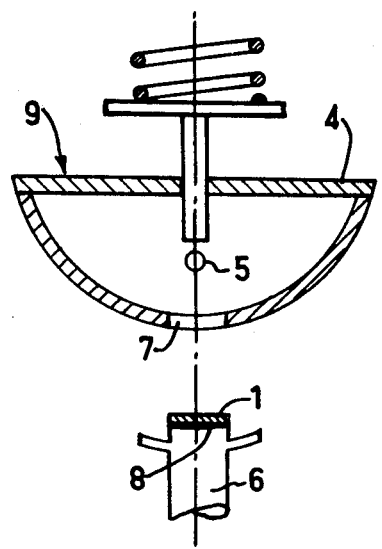

In FIG. 1 the apparatus 9 is represented prior to its operation. FIG. 2 shows the apparatus comprising an inlay 1 placed on the support means 6, particularly on the supporting surface 8 element 1 having a flat shape.

In FIG. 3, the apparatus 9 is shown after the support means 6 has been displaced by the means 17 so that the inlay 1 is placed in its correct relative position, that is, opposite the aperture 7. The inlay 1 is still flat in shape.

In FIG. 4, the apparatus 9 is shown after the means 16 has been activated, that is, the plunger 21 is applied to the inlay 1 shaped to the support surface 8.

Figures 5, 6:
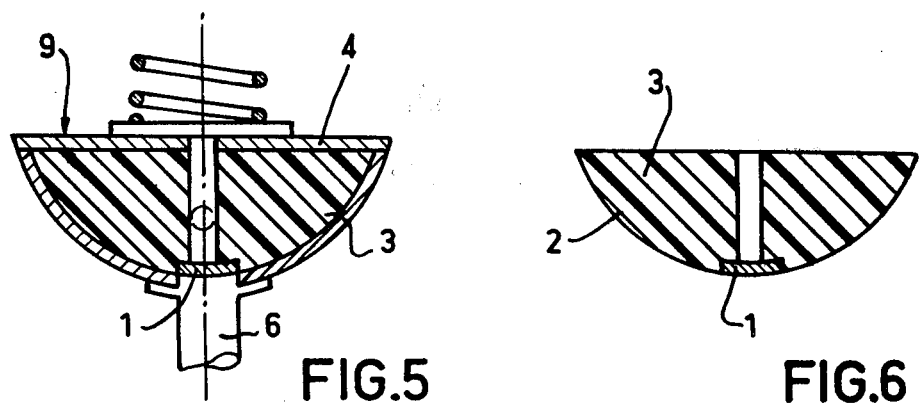
FIG. 6 is a diagrammatic cross-sectional view showing the article obtained by the employment of the method and by means of the apparatus pursuant to the invention.

FIG. 5 shows the apparatus 9 after the mold has been filled with the material that is to constitute the main piece 3.

Figure 7:
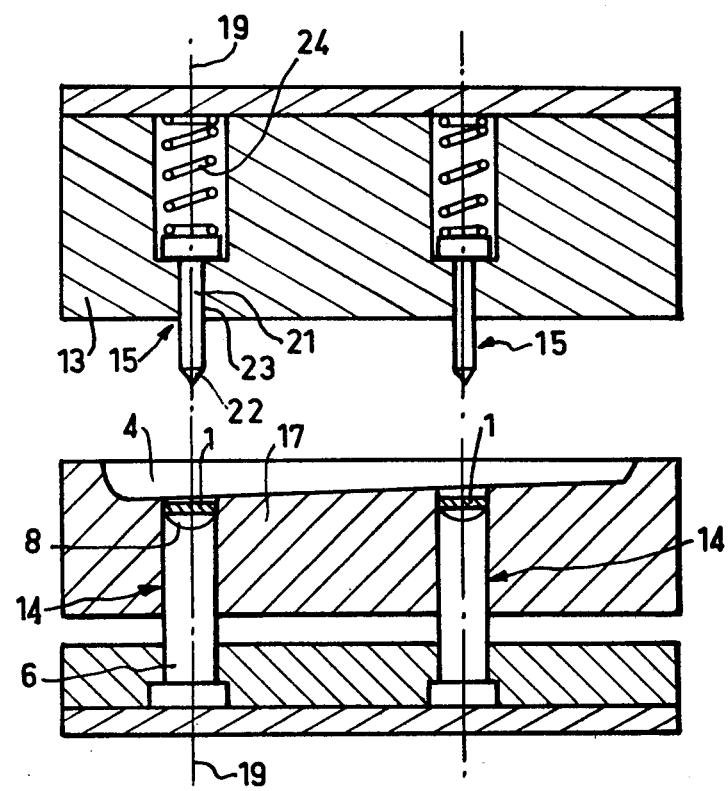
FIG. 7 is a longitudinal cross-sectional view of an embodiment of the apparatus of the invention (mold open).

In FIG. 7 there is shown a possible embodiment of an apparatus of the invention for placing two inlays 1 in the same main piece. These two inlays 1, and the related assemblies of means 14, 15 and 16, can be more or less close together or far apart, and particularly they can be adjacent one another.

In this embodiment, the mold 4 and the wall 13 are, in a manner known in itself, in the general form of blocks comprising bores for the mandrel 6 and plunger 21. The various mandrels 6 are rigidly associated with a piece likewise in the form of a block—to permit a simultaneous displacement of the mandrel 6—forming part of the means 17 and able to abut against the block constituting the mold 4 to limit the stroke of the mandrels 6. The bore for the mandrels 6 also permits a better emplacement of the inlay 1.

The means 24 are placed in a cavity in the block constituting the wall 13, closed at the end opposite the plunger 21 by a cover which also constitutes a means for limiting the travel of the plungers 21, which are functionally independent of one another.

The invention lastly concerns the main piece 3 obtained by the employment of the method and apparatus which have just been described. This piece is, for example, the handle of a hand tool or a cutlery handle, and it includes an inlay 1 placed on the curved surface 2. The inlay 1 has a certain malleability such that it can easily be deformed by the means 16. The inlay 1 has no stud or the like for fixation to the main piece 3.

Once the main piece has been made, it contains, in back of the inlay 1, a hole passing through it from side to side.

I claim:

1. A method for the flush embedding of a stiff inlay piece having a certain malleability and at least a quasi-flat initial form into a curved surface or a rigid substantially solid main piece made by using a mold, comprising before filling the mold with a material constituting the main piece, the steps of holding the inlay on a support means having a curved surface substantially the same shape as the main piece, introducing said inlay into the mold and placing it in a relative position corresponding to a location which it is to occupy on the piece made in the mold, fixedly holding the inlay in this position and forcibly pressing and deforming the inlay piece, by pressing the point of a conical pressure means against the inlay piece on the support so that the deformation of the stiff inlay is permanent, the pressure means being located on the side of said inlay opposite to that held on said support means so that said inlay assumes a shape complementary to that of the mold, the pressure means and the support means being moved in opposite directions.

2. Method according to claim 1 wherein no step of polishing and the like is required to eliminate any projection of the inlay with respect to the main piece final or posterior to the filling of the mold with the material constituting the main piece.

3. Method to claim 1 or 2, wherein said mold has an aperture situated in said relative position of the inlay in the mold, said curved surface of said support means has a shape and size corresponding to that of said aperture and said inlay after deformation, and said pressure means is moved inside said mold towards said aperture to apply the inlay forcibly against said curved surface until the inlay is deformed so as to match the shape of said surface.

4. Apparatus for flushly embedding a malleable but stiff inlay piece having at least a quasi-flat general shape into a curved surface of a substantially solid, rigid main piece, comprising a mold for making the main piece means for filling the mold with a material constituting the main piece, support means having a curved surface substantially the same shape as the main piece for holding said inlay, means for placing said inlay in a relative position which it is to occupy in the mold and which corresponds to the location of the inlay on the piece made in the mold, and conical pressure means positioned on the side of said inlay opposite to that held on said support means cooperating with said support means to fixedly hold the inlay in said relative position and press it against said curved surface to forcibly deform the inlay until the ilay assumes a shape complementary to that of the mold, a conical point of said pressure means being positionable against the inlay piece, and means for displacing the support means and the pressure means in opposite directions.

5. Apparatus according to claim 1, wherein no means is required for polishing and the like to eliminate any projection of the inlay with respect to the main piece.

6. Apparatus according to claim 5, wherein the mold has an aperture of a shape, size and relative position corresponding to the contour, dimension, and relative position of the inlay in the mold, and said curved surface of said support means has a complementary curved shape corresponding to the aperture of the mold.

7. Apparatus according to claim 6, wherein said pressure means is movable inside said mold towards said aperture where the inlay is supported by said support means to press the inlay on said opposite side thereof.

8. Apparatus according to claim 7, wherein the mold has a shell shape and said aperture is placed in the lower part of the mold.

9. Apparatus according to claim 8, wherein said pressure means comprises a plunger having an axis along which it slides inside said mold towards said aperture.

10. Apparatus according to claim 9, wherein said support means is located outside said mold and is coaxial with said plunger with respect to said axis.

11. Apparatus according to claim 10, wherein said support means comprises a mandrel having an end face constituting said curved surface.

12. Apparatus according to claim 11, wherein resilient means are povided for urging said plunger towards the aperture.

13. Apparatus according to claim 12, wherein said support means and plunger have peripheral projections for limiting the respective movements thereof and for producing seals with the mold.

* * * * *